Sept. 14, 1943.    J. M. DALIMATA    2,329,596
HARVESTER REEL
Filed Nov. 17, 1942    4 Sheets-Sheet 1
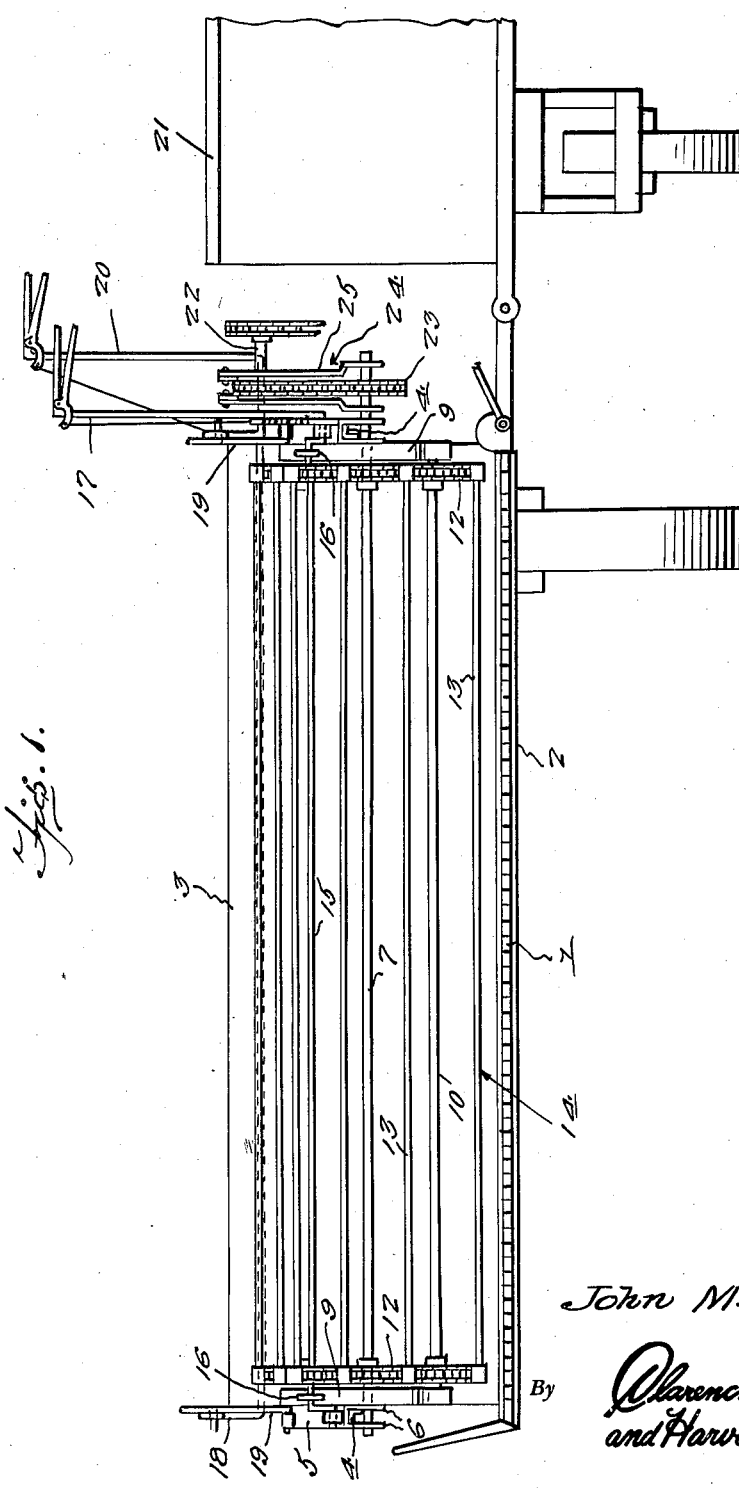
Inventor
John M. Dalimata
By Clarence A. O'Brien
and Harvey B. Jacobson
Attorney

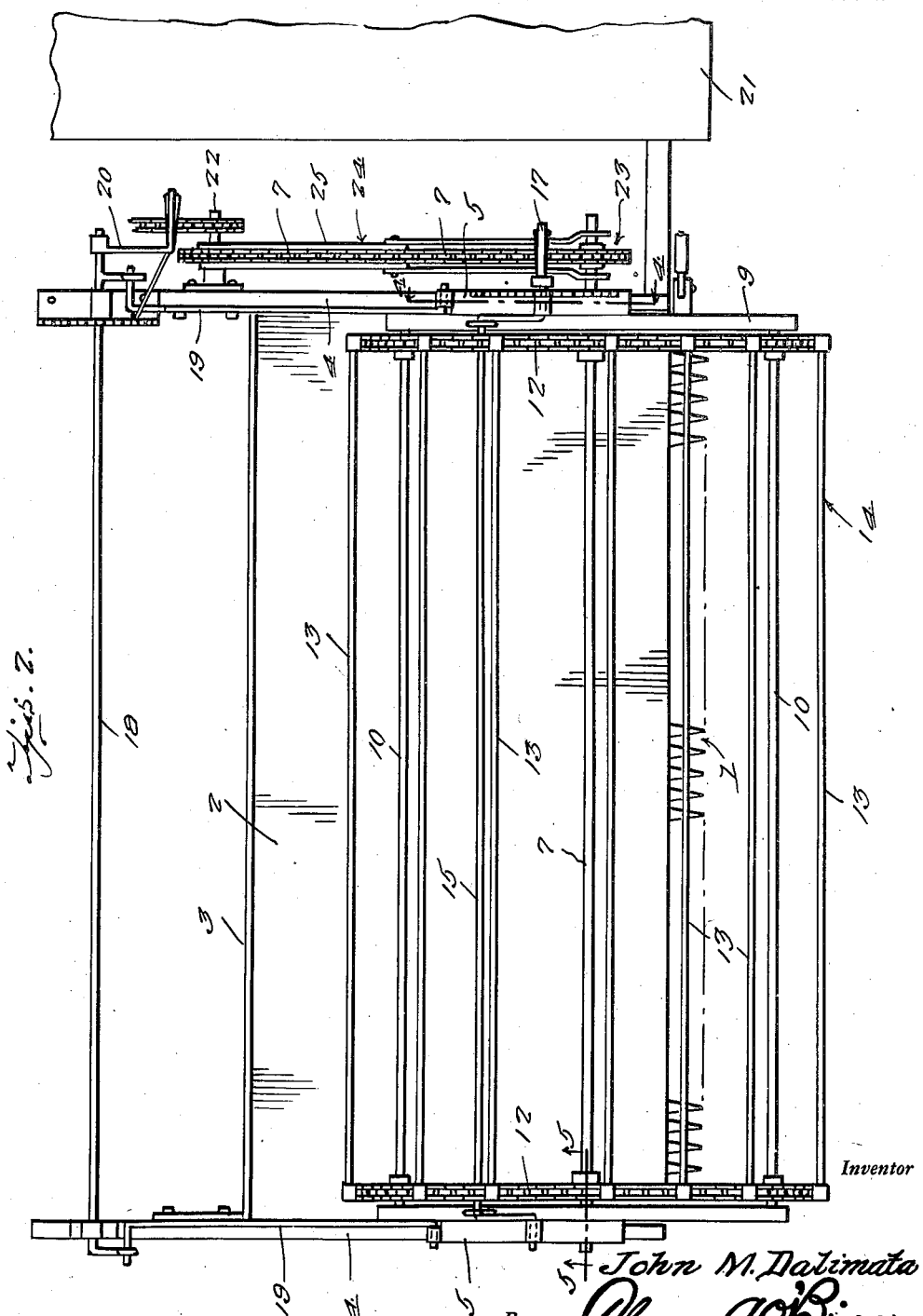

Sept. 14, 1943. J. M. DALIMATA 2,329,596
HARVESTER REEL
Filed Nov. 17, 1942 4 Sheets-Sheet 3
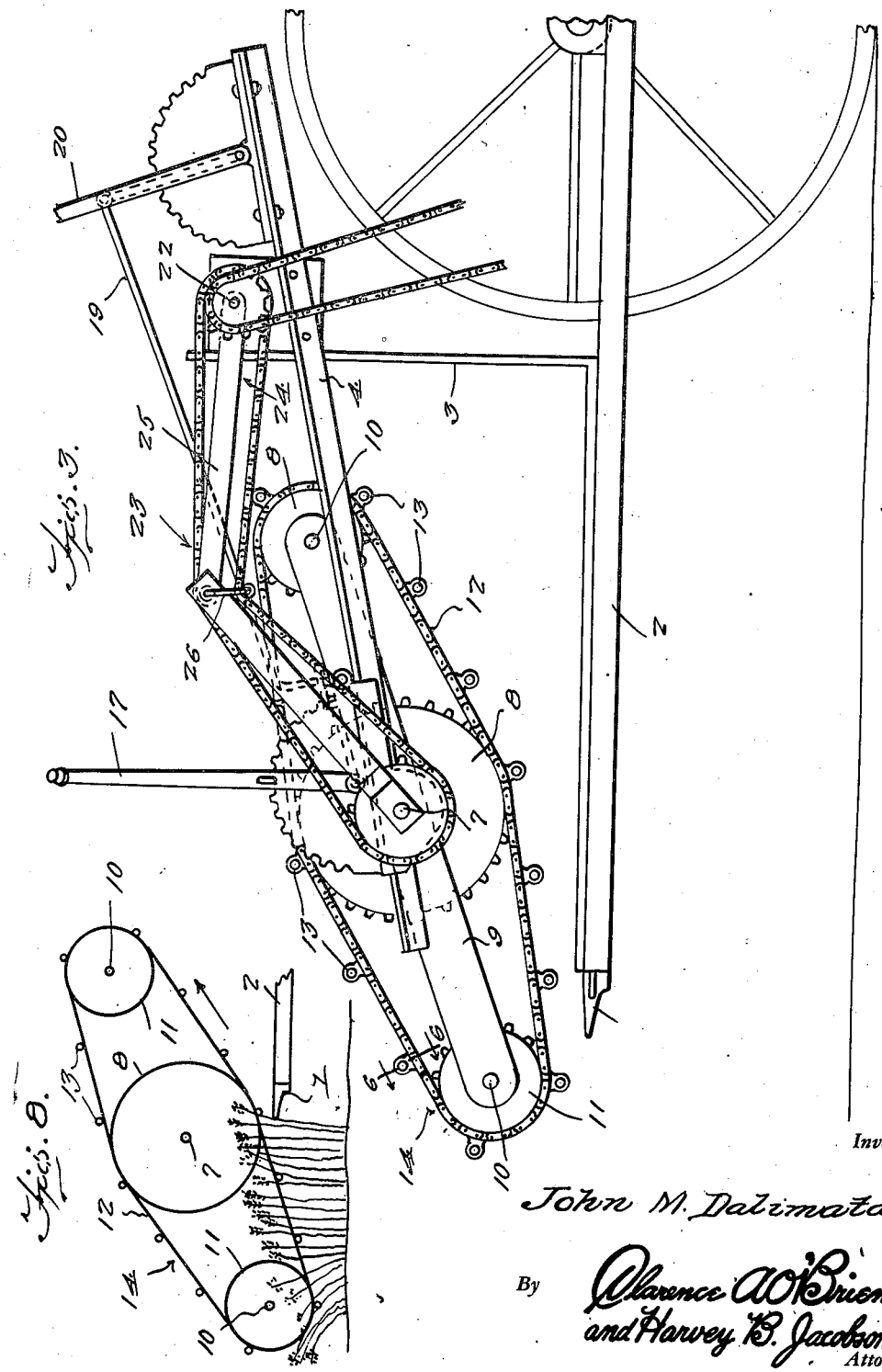
Inventor
John M. Dalimata
By Clarence A. O'Brien
and Harvey B. Jacobson
Attorneys

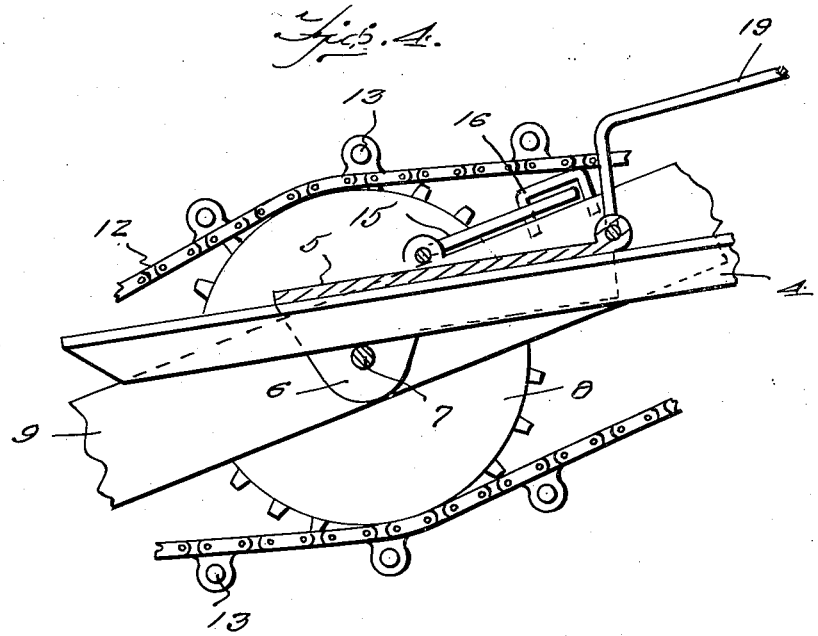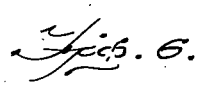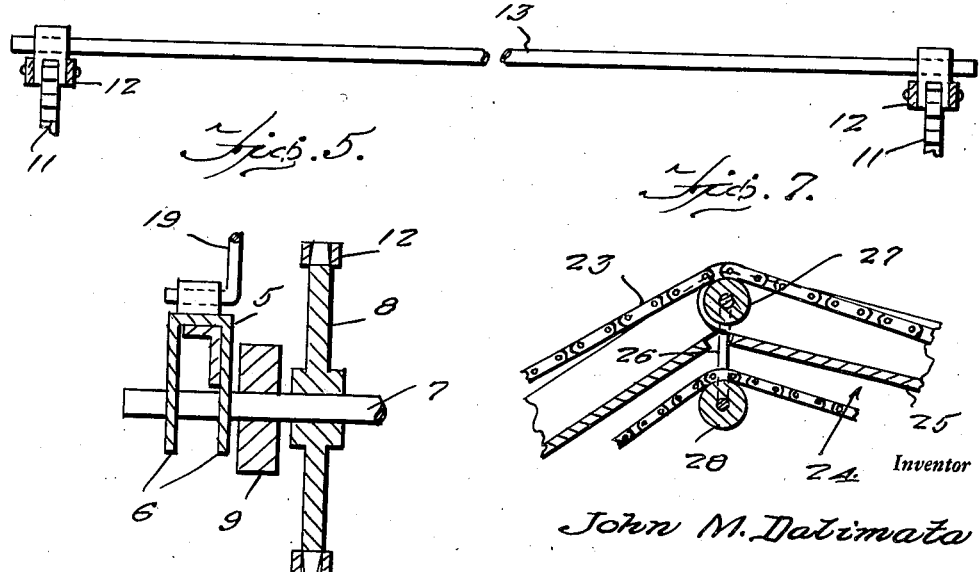

Patented Sept. 14, 1943

2,329,596

UNITED STATES PATENT OFFICE 2,329,596

HARVESTER REEL

John M. Dalimata, Chester, Mont.

Application November 17, 1942, Serial No. 465,886

2 Claims. (Cl. 56—219)

The present invention relates to new and useful improvements in reels for harvesters, combines, et cetera, and has for its primary object to provide a device of this character of the endless type and comprising a unique construction and arrangement for raising and supporting the grain until it is reached and cut by the sickle bar of the machine.

Another very important object of the invention is to provide novel means for rockably and shiftably adjusting the endless reel to meet various conditions.

Still another very important object of the invention is to provide an endless reel of the character described comprising a chain drive including novel means for automatically tightening the chain as the reel is shifted.

Other objects of the invention are to provide an endless harvester reel which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings, wherein like characters of reference designate corresponding parts throughout the several views and wherein:

Figure 1 is a view in front elevation of an endless reel constructed in accordance with the present invention.

Figure 2 is a top plan view thereof.

Figure 3 is a view in side elevation.

Figure 4 is a fragmentary view in vertical longitudinal section, taken substantially on the line 4—4 of Figure 2.

Figure 5 is a cross-sectional view, taken substantially on the line 5—5 of Figure 2.

Figure 6 is a cross-sectional view through the upper flight of the endless reel, taken substantially on the line 6—6 of Figure 3.

Figure 7 is a view in vertical longitudinal section through an intermediate portion of the automatic chain tightener, taken substantially on the line 7—7 of Figure 2.

Figure 8 is a diagrammatic view, illustrating the operation of the reel.

Referring now to the drawings in detail, it will be seen that reference numeral 1 designates a conventional sickle bar which is mounted on the front of a platform 2. Secured at an intermediate point on the back member 3 of the binder platform 2 is a pair of forwardly and downwardly inclined angle iron arms 4.

Substantially channel-shaped slides 5 are operable on the inclined arms 4. The slides 5 include depending bearings 6 (see Figs. 4 and 5) in which the end portions of a drive shaft 7 are journaled. Sprocket wheels 8 are fixed on the shaft 7 inwardly of the arms 4.

Crossheads 9 are rockably mounted on the shaft 7 between the sprocket wheels 8 and the arms 4. Stationary shafts 10 extend transversely between the end portions of the crossheads 9. Comparatively small sprocket wheels 11 are journaled on the stationary shafts 10 in alignment with the sprocket wheels 8.

Endless chains 12 are mounted on the aligned sprockets 8 and 11. Mounted transversely on the endless chains 12 at spaced points are rods or slats 13. It will thus be seen that an endless reel 14 has been provided which is operable forwardly of and above the sickle bar 1 of the machine.

A crank shaft 15 is rockably mounted on the slides 5. The throw of the crank shaft 15 is operatively connected to the crossheads 9 through the medium of substantially U-shaped guides 16 on said crossheads. The crank shaft 15 extends transversely through the reel 14. On one end portion of the crank shaft 15 is a hand lever 17 for rockably adjusting the reel 14 on the shaft 7.

Rockably mounted on the rear end portions of the arms 4 is a transversely extending crank shaft 18. Rods 19 operatively connect the slides 5 to the crank shaft 18 for actuation thereby. A hand lever 20 is provided on one end portion of the crank shaft 18. It will be observed that the hand levers 17 and 20 are located for convenient operation from the machine 21.

The shaft 7 is driven from a short shaft 22 through a chain and sprocket connection 23. Mounted on the shafts 7 and 22 is an automatic tightener 24 for the chain drive 23. The tightener 24 includes a toggle 25 of channel bars having their outer end portions journaled on the shafts 7 and 22. As best seen in Figures 3 and 7 of the drawings, the inner ends of the bars of the toggle 25 are pivotally connected by one of the legs of a depending U member 26. Journaled on this leg of the U member 26, within the channel bars of the toggle 25, is a roller 27 over which the upper flight of the drive chain 23 passes. The lower flight of the drive chain 23 passes over a roller 28 which is journaled on the other or lower leg of the U member 26.

It is thought that the operation of the device will be readily apparent from a consideration of the foregoing. Briefly, as the endless reel 14 travels in a counter-clockwise direction, the grain, even though it be leaning forwardly, is engaged by the rods 13, straightened up and supported until the sickle bar 1 arrives and cuts said grain, as suggested in Figure 8 of the drawings. Though the medium of the hand lever 17, the crank shaft 15 may be rocked for adjusting the inclination of the reel 14 as desired. By actuating the shaft 18 through the medium of the hand lever 20, the slides 5, through the rods 19, are shifted longitudinally on the arms 4 for moving the reel 14 forwardly relative to the sickle bar 1 or for retracting said reel. As the reel 14 is thus adjusted forwardly and rearwardly on the arms 4, the toggle 25 opens and closes in a manner to maintain the correct tension on the chain drive 23 at all times.

It is believed that the many advantages of an endless harvester reel constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A harvester reel of the character described comprising a supporting structure including a pair of inclined arms, slides operable on said arms, a shaft journaled on said slides, crossheads rockably mounted on the shaft, sprocket wheels fixed on said shaft, sprocket wheels rotatable on the end portions of the crossheads and aligned with the first-named sprocket wheels, endless chains operable on the aligned sprocket wheels, rods extending between the endless chains, means for actuating the shaft for driving the chains, means on the slides for rocking the crossheads on the shaft, and means on the arms for actuating the slides for shifting the shaft, the crossheads, the sprocket wheels and the endless chains.

2. A harvester reel comprising a supporting structure, a shaft rotatably mounted on the supporting structure, another shaft rotatably and shiftably mounted on the supporting structure, an endless reel mounted on the second-named shaft, means including an endless chain for driving the second-named shaft from the first-named shaft for actuating the reel, and a tightener for said chain, said tightener including a toggle comprising channel bars having their outer ends journaled on the shafts, a U member pivotally connecting the inner ends of said bars, and rollers journaled on the legs of said U member and operatively engaged with the flights of the chain.

JOHN M. DALIMATA.